US010106040B2

(12) United States Patent
Vitullo et al.

(10) Patent No.: US 10,106,040 B2
(45) Date of Patent: Oct. 23, 2018

(54) REGENERATIVE BRAKING SYSTEM AND METHOD

(71) Applicant: FORD GLOBAL TECHNOLOGIES, LLC, Dearborn, MI (US)

(72) Inventors: Charles Vitullo, Allen Park, MI (US); Brian Thomas Soo, West Bloomfield, MI (US); Kimberly Trice, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/419,331

(22) Filed: Jan. 30, 2017

(65) Prior Publication Data
US 2018/0215272 A1    Aug. 2, 2018

(51) Int. Cl.
| | |
|---|---|
| *B60L 7/18* | (2006.01) |
| *B60K 6/22* | (2007.10) |
| *B60T 7/04* | (2006.01) |
| *B60T 7/22* | (2006.01) |
| *B60T 13/74* | (2006.01) |

(52) U.S. Cl.
CPC .................. *B60L 7/18* (2013.01); *B60K 6/22* (2013.01); *B60T 7/042* (2013.01); *B60T 7/22* (2013.01); *B60T 13/741* (2013.01); *B60L 2240/16* (2013.01); *B60L 2240/423* (2013.01); *B60L 2240/486* (2013.01); *B60L 2250/26* (2013.01); *B60L 2260/46* (2013.01); *B60T 2201/02* (2013.01); *B60T 2270/60* (2013.01); *Y10S 903/947* (2013.01)

(58) Field of Classification Search
CPC .. B60L 7/18; B60L 2240/16; B60L 2240/423; B60L 2240/486; B60L 2250/26; B60L 2260/46; B60K 6/22; B60T 7/042; B60T 7/22; B60T 13/741; B60T 2201/02; B60T 2270/60; Y10S 903/947
USPC .............................. 701/96, 22, 70; 903/947
See application file for complete search history.

(56) References Cited

U.S. PATENT DOCUMENTS

| | | |
|---|---|---|
| 5,707,115 A | 1/1998 | Bodie et al. |
| 6,655,754 B2 | 12/2003 | Cromez et al. |

(Continued)

*Primary Examiner* — Marthe Y Marc-Coleman
(74) *Attorney, Agent, or Firm* — David B. Kelley; Brooks Kushman P.C.

(57) ABSTRACT

A hybrid electric vehicle (HEV) and methods for operation having a powertrain that includes an engine, an electric machine and storage battery, and a transmission coupled via a drive shaft to wheels having regenerative-friction brakes. The HEV and transmission incorporate regenerative and adaptive braking and a capability to detect nearby obstacles and other vehicles. Such controllers monitor and report the nearby-vehicle distance and a brake pedal tip-lift time and position. In response, the controller(s) cause the electric machine to generate electric power with negative torque, which decelerates the transmission and wheels at a constant or variable rate, adjusted so the nearby-vehicle distance during deceleration equals or exceeds a predetermined, lead-lag distance to nearby vehicles or obstacles. An adaptive cruise signal may also be generated that may indicate driver vehicle preferred settings and profiles, and constant, adjustable, learned, and driver selectable deceleration profiles, which are utilized to control deceleration during braking.

7 Claims, 3 Drawing Sheets

(56) References Cited

U.S. PATENT DOCUMENTS

| | | |
|---|---|---|
| 6,739,677 B2 | 5/2004 | Tazoe et al. |
| 7,034,482 B2 | 4/2006 | Komiyama et al. |
| 9,002,609 B2 | 4/2015 | Nakamura et al. |
| 2015/0019058 A1* | 1/2015 | Georgiev .................. B60L 7/18 701/22 |

* cited by examiner

REGENERATIVE BRAKING SYSTEM AND METHOD

TECHNICAL FIELD

The present disclosure relates generally to systems and methods for control of regenerative braking in a hybrid electric vehicle.

BACKGROUND

Hybrid electric vehicles (HEVs) have a powertrain that includes an internal combustion engine (ICE) and an electric machine or electric motor generator/starter (M/G), which generate power and torque to propel the vehicle. HEVs also may include later generation transmissions that include various configurations enabling advanced operations and improved performance. Such engine, electric machine, and transmission components may implement one or more regenerative braking capabilities incorporating various controllers, components, and systems that enable optimized energy recovery during electric, frictional, and cooperative braking of HEV.

SUMMARY

A vehicle and methods of operation according to the present disclosure include a driveline with a powertrain having an engine and an electric machine coupled with a clutch, and coupled to a battery or other power storage device. A vehicle driveline includes and is powered by the powertrain, which also includes a transmission and a torque convertor with a bypass or launch clutch that couples the powertrain to drive shafts and wheels having friction, regenerative, and/or combination regenerative-friction brakes, among other components. The vehicle further includes one or more controllers coupled to the driveline and powertrain that are configured to generate and respond to various commands, signals, and parameters that may enable a variety of capabilities.

For example, in HEVs having later generation transmissions and regenerative and adaptive braking capabilities that may be capable of detecting nearby obstacles and other vehicles in traffic, such controllers may generate and respond to a proximate vehicle signal that indicates and/or includes a nearby-vehicle distance and a brake pedal signal that includes and/or indicates a brake pedal tip-lift time and position occurring during a sequence of operation. The nearby-vehicle distance extends between the HEV and a nearby vehicle. In response, the controller(s) may cause the electric machine to regenerate electric power with negative torque by capturing kinetic energy from the transmission and wheels.

The electric machine also decelerates the transmission and wheels at a rate adjusted by a deceleration-rate signal that corresponds to the nearby-vehicle distance and defines how quickly the transmission will be decelerated to slow the HEV. An adaptive cruise signal may also be generated and communicated, which can include and/or indicate driver and vehicle settings and profiles, and driver selectable deceleration profiles, and a lead-lag distance that defines a preferred minimum distance between the HEV and a nearby vehicle or obstacle or traffic, over which HEV is to be decelerated behind or in front of the nearby obstacle or vehicle.

The HEV may further include one or more or at least one proximity sensor(s) that is/are in communication with and coupled to the controller(s). Such sensors are configured to detect a distance to a nearby vehicle or other obstacle, and may also be configured to generate and communicate the nearby-vehicle distance. Further, the controller(s) is or may be configured to adjust the deceleration-rate signal causing the electric machine to increase the negative torque to a magnitude that causes the nearby-vehicle distance to approximately equal or exceed the lead-lag distance.

The HEV may include variations to the other arrangements disclosed herein, to have the deceleration-rate signal indicating and/or including a plurality of calibrated and learned-brake-deceleration-rates, which learned-brake-deceleration rate may average a plurality of prior braking signals, which are recorded during prior braking events. Another arrangement includes one or more of the deceleration-rate signals including a rate selected from one of a plurality of calibrated-deceleration rates that are predetermined for a range of various HEV performance and component capabilities. The controller(s) can use the selected rate to adjust and cause the electric machine to decelerate the transmission.

The learned-brake-deceleration-rate and the selected calibration-deceleration rates may be utilized by the controller(s) to cause the electric machine to increase the negative torque and to decelerate the transmission at the learned-brake-deceleration-rate, which rate can also be further adjusted to approximately maintain the nearby-vehicle distance. In other modifications, the proximity sensor(s) may generate the nearby-vehicle distance to be a follow or lag distance between a front end of the vehicle to the nearby vehicle, and/or a lead distance between a rear end of the vehicle to the nearby vehicle. In other configurations, the controller(s) are further configured to cause the electric machine to decelerate the transmission at the selected rate or another rate when the nearby-vehicle distance is undetected when no other vehicles are nearby.

Still other variations are contemplated wherein HEV includes the transmission further coupled to an output drive shaft and a plurality of wheels, which each incorporate friction, regenerative, and/or combination regenerative-friction brakes. The modified configurations may also be coupled to a brake control system in communication with the other controllers to cooperatively generate, store, and communicate the learned-brake-deceleration-rate. These adaptations may be further modified with the controller configured to receive and respond to an acceleration pedal signal or a second brake pedal signal that does not indicate and/or contain a pedal tip-lift time and position. The controller response(s) to an acceleration pedal signal or a second brake signal discontinues deceleration.

Further modifications include the controllers also configured to decelerate the transmission and thereby the drive shafts and wheels cooperatively using both the electric machine and the friction, regenerative, and/or combination regenerative-friction brakes. The electric machine and brakes, in response to the proximate vehicle signal and brake pedal signal, are adjusted according to and/or utilizing the deceleration-rate signal and the corresponding nearby-vehicle distance, among other signals and parameters. The controllers are also in communication with a battery having a charge state below a maximum or optimal charge.

Here, the controller(s) adjust or modify the negative torque of the electric machine during braking to regenerate the kinetic energy from the decelerating transmission, drive shafts; and wheels, into electrical energy for recharging the battery up to and not exceeding the maximum charge state. As negative torque is increased, the controllers may cooperatively decrease the negative torque supplied by the friction, regenerative, and/or combination regenerative-friction brakes to meet the selected deceleration commanded by the deceleration-rate signal.

The vehicle of the present disclosure also contemplates methods of operation of each of the preceding configurations and variations, which include, among others, a controller or controllers responding to the proximate vehicle signal indicating and/or having the nearby-vehicle distance and the brake pedal signal including and/or indicating a brake pedal tip-lift time and position and sequence of operation. In response, such controllers command components of the HEV to enable regenerative braking and other capabilities. For example, the controller(s) command the electric machine to generate electric power with negative torque that is adjusted to increase the charge state of the battery without exceeding the maximum or optimal charge.

At the same time, in parallel, and/or next in series, the controller(s) thereby decelerate the transmission, drive shaft, and wheels, using the deceleration-rate signal, which may be adjusted to increase the nearby-vehicle distance to the HEV to approximately equal or exceed a predetermined or adjusted lead-lag distance. In variations of the methods of operation and other capabilities described elsewhere herein, the transmission is again coupled to the drive shaft and wheels having regenerative-friction brakes. The adaptive cruise signal indicates and/or includes the lead-lag distance, and the proximity sensor(s) detect a distance to a nearby vehicle and generate the nearby-vehicle distance. The controller(s) adjust(s) the deceleration-rate signal as before to cause the electric machine to increase the negative torque to a magnitude that causes the nearby-vehicle distance to approximately equal or exceed the lead-lag distance.

This summary of the implementations and configurations of these vehicles and methods of operation describe in less technically detailed variations, several exemplary arrangements for the embodiments of this disclosure, and such are further described in more detail below in the detailed description in connection with the accompanying illustrations and drawings, and the claims that follow. This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example configurations, as is further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like and similar reference numbers refer to similar, related, and/or identical elements throughout the figures. The figures and annotations thereon are provided to facilitate understanding of the disclosure without limiting the breadth, scope, scale, or applicability of the disclosure. The drawings are not necessarily made to scale and may be schematic diagrams intended to describe the disclosure to those knowledgeable in the relevant fields of technology.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described herein and in any of the figures may be combined with features, components, and processes illustrated in one or more other figures to produce embodiments that should be apparent to and within the knowledge of those skilled in the art, but which may not be explicitly illustrated or described. The combinations of features illustrated here are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
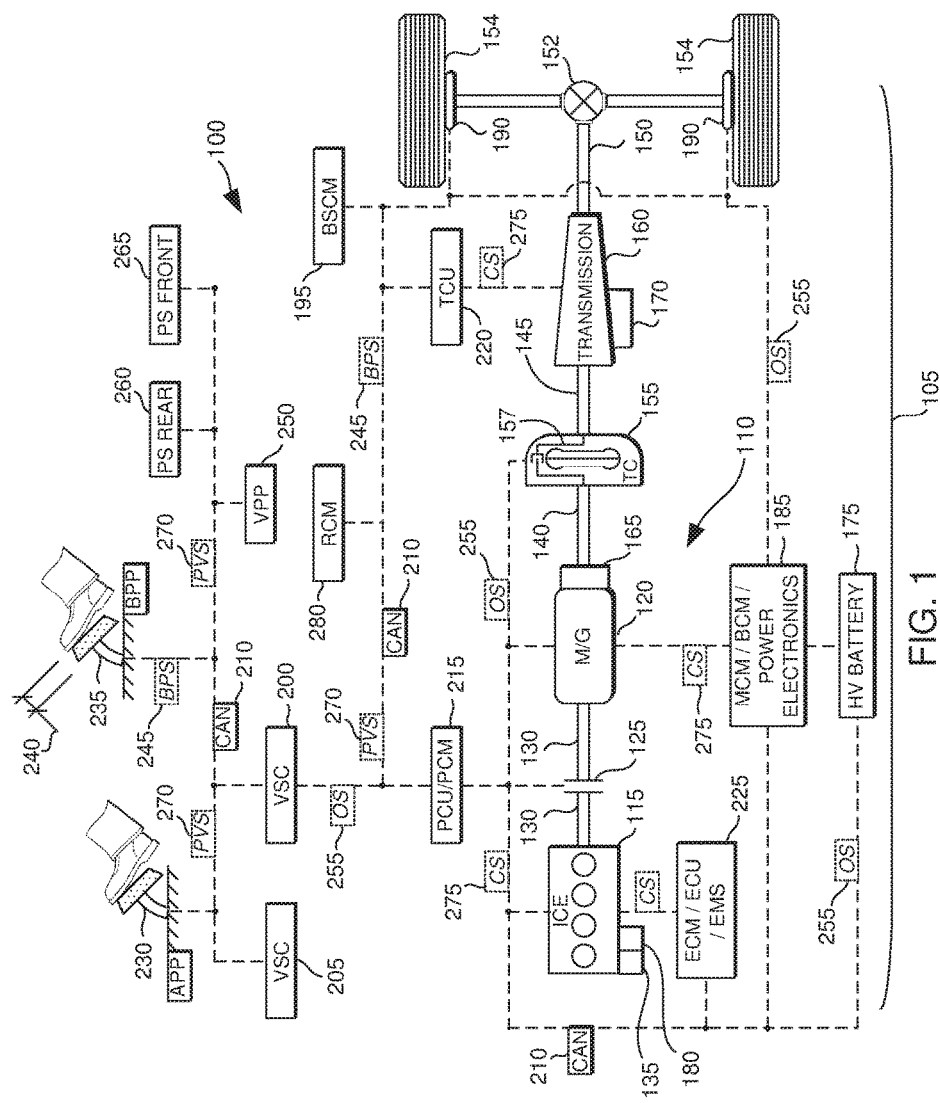
FIG. 1 is an illustration of a hybrid electric vehicle and its systems, components, sensors, actuators, and methods of operation.

With reference now to the various figures and illustrations and to FIGS. 1, 2, 3, and 4, and specifically to FIG. 1, a schematic diagram of a hybrid electric vehicle (HEV) 100 is shown, and illustrates representative relationships among components of HEV 100. Physical placement and orientation of the components within vehicle 100 may vary. Vehicle 100 includes a driveline 105 that has a powertrain 110, which includes an internal combustion engine (ICE) 115 and an electric machine or electric motor/generator/starter (M/G) 120, which generate power and torque to propel vehicle 100. Engine 115 is a gasoline, diesel, biofuel, natural gas, or alternative fuel powered engine, or a fuel cell, which generates an output torque in addition to other forms of electrical, vacuum, pressure, and hydraulic power by way of front end engine accessories described elsewhere herein. Engine 115 is coupled to electric machine or M/G 120 with a disconnect clutch 125. Engine 115 generates such power and associated engine output torque for transmission to M/G 120 when disconnect clutch 125 is at least partially engaged.

M/G 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to M/G 120 to enable operation as an electric generator, and to other components of vehicle 100.

Similarly, M/G 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, M/G or electric machine 120 may assist engine 115 in a "hybrid electric mode" or an "electric assist mode" by transmitting additional power and torque to turn drive shafts 130 and 140. Also, M/G 120 may operate in an electric only mode wherein engine 115 is decoupled by disconnect clutch 125 and shut down, enabling M/G 120 to transmit positive or negative torque to M/G drive shaft 140. When in generator mode, M/G 120 may also be commanded to produce negative torque and to thereby generate electricity for charging batteries and powering vehicle electrical systems, while engine 115 is generating propulsion power for vehicle 100. M/G 120 also may enable regenerative braking by converting rotational, kinetic energy from powertrain 110 and/or wheels 154 during deceleration, into regenerated electrical energy for storage, in one or more batteries 175, 180, as described in more detail below.

Disconnect clutch 125 may be disengaged to enable engine 115 to stop or to run independently for powering engine accessories, while M/G 120 generates drive power and torque to propel vehicle 100 via M/G drive shaft 140, torque convertor drive shaft 145, and transmission output drive shaft 150. In other arrangements, both engine 115 and M/G 120 may operate with disconnect clutch 125 fully or partially engaged to cooperatively propel vehicle 100 through drive shafts 130, 140, 150, differential 152, and wheels 154. Differential 152 may transmit approximately equal torque to each wheel 154 and accommodates slight speed differences to enable the vehicle to turn and maneuver. Different types of differentials or similar devices may be used to distribute equal and/or unequal torque from powertrain 110 to wheels 154, for rear-dive, front-drive, and all-wheel drive vehicles. In some vehicles, differential torque distribution may be controlled and varied to enable desired operating modes or conditions wherein each vehicle wheel 154 receives different torque. Driveline 105 may be further modified to enable regenerative braking from one or any wheel 154 using a selectable and/or controllable differential torque capability.

Drive shaft 130 of engine 115 and M/G 120 may be a continuous, single, through shaft that is part of and integral with M/G drive shaft 140, or may be a separate, independent drive shaft 130 that may be configured to turn independently of M/G drive shaft 140, for powertrains 110 that include multiple, inline, or otherwise coupled M/G 120 configurations. The schematic of FIG. 1 also contemplates alternative configurations with more than one engine 115 and/or M/G 120, which may be offset from drive shafts 130, 140, and where one or more of engines 115 and M/Gs 120 are positioned in series and/or in parallel elsewhere in driveline 105, such as between or as part of a torque convertor and a transmission, off-axis from the drive shafts, and/or elsewhere and in other arrangements. Still other variations are contemplated without deviating from the scope of the present disclosure.

Driveline 105 and powertrain 110 also include a transmission that includes a torque convertor (TC) 155, which couples engine 115 and M/G 120 of powertrain 110 with and/or to a transmission 160. Transmission 160 may be a multiple step-ratio, and/or a multiple and variable torque-multiplier-ratio, automatic and/or manual transmission or gearbox 160 having a plurality of selectable gears. TC 155 may further incorporate a bypass clutch and clutch lock 157 that may also operate as a launch clutch, to enable further control and conditioning of the power and torque transmitted from powertrain 110 to other components of vehicle 100. The TRANSMISSION may include TC 155 and bypass clutch 157 to be integral with transmission 160 in some variations. TC bypass clutch 157, which may also sometimes be referred to as a torque convertor lock-up clutch, is typically configured to frictionally or mechanically couple the impeller and the turbine to rotate as an integral unit, which eliminates variable hydraulic slip energy loss and establishes more efficient power transfer across TC 155.

Transmission or gearbox 160 may include gear sets (not shown) or a plurality of manually and/or automatically selectable gears that are selectively placed in different gear ratios by manually or automatically actuated hydraulic or electromechanical engagement of clutches and brakes, and other elements, to establish the desired multiple, discrete, or step drive and torque multiplier ratios. Transmission 160 is manually and/or automatically shifted by the controllers from one torque multiplier ratio to another based on various vehicle operating conditions, and then transmits powertrain output torque to output drive shaft 150, as well as enabling M/G 120 to capture kinetic energy during deceleration. Transmission 160 is but one example of a transmission or gearbox arrangement, and any comparable component that converts and transmits input torque(s) from engine 115 and M/G 120 to output drive shaft 150, is contemplated for use with the embodiments described herein.

In other variations, a transmission oil pump 165 is included and is coupled to M/G 120 to produce hydraulic oil pressure for any number of components, which can include, for example, release or disconnect clutch 125, torque converter 155, bypass clutch 157, and transmission 160, when engine 115 is decoupled and/or powered down. An electric auxiliary transmission oil pump 170 may also be included for use alone or in combination with other components, and to also supplement and/or generate hydraulic pressure when both engine 115 and M/G 120 are unpowered, or otherwise unable to produce hydraulic pressure.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for M/G 120 and during regenerative braking, and for other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, M/G 120, and vehicle 100, as depicted in FIG. 1, through various mechanical and electrical interfaces and vehicle controllers, as described elsewhere herein. High voltage M/G battery 175 is also coupled to M/G 120 by one or more of a motor control module (MCM), a battery control module (BCM), and/or power electronics 185, which are configured to condition direct current (DC) power provided by high voltage (HV) battery 175 for M/G 120. MCM/BCM 185 is also configured to condition, invert, and transform DC battery power into three phase alternating current (AC) as is typically required to power electric machine or M/G 120. MCM/BCM 185 is also configured to charge one or more batteries 175, 180 with energy generated by M/G 120 and/or front end accessory drive components, and to supply power to other vehicle components as needed.

Vehicle 100 may also incorporate one or more friction, regenerative, and/or combination regenerative-friction brakes 190 coupled to wheels 154 and brake system control module (BSCM) 195. As described here, use of the phrases brakes 190, or regenerative-friction brakes 190 is intended, for example, to contemplate one or more or combinations of such friction, regenerative, and/or combination regenerative-friction brakes 190. Brakes 190 and BSCM 195 may be operative to mechanically and/or electrically decelerate wheels 154, and to enable regenerative braking that captures deceleration energy from wheels 154, and in cooperation with MCM/BCM 185, and possibly other controllers, M/G 120, and other components, enable(s) charging of HV battery(ies) 175 and other batteries 180, and other power storage components.

With continued reference to FIG. 1, vehicle 100 further includes one or more controllers and computing modules and systems that enable a variety of vehicle capabilities. For example, vehicle 100 may incorporate a vehicle system controller (VSC) 200 and a vehicle computing system (VCS) and controller 205, which are in communication with MCM/BCM 185, BSCM 195, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

While illustrated here for purposes of example, as discrete, individual controllers, MCM/BCM 185, BSCM 195, VSC 200 and VCS 205 may control, be controlled by, communicate signals to and from, and exchange data with other controllers, and other sensors, actuators, signals, and components that are part of the larger vehicle and control systems and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip (SoCs) may be used to precondition and preprocess particular signals during communications, and before and after such are communicated.

In further illustrations, MCM/BCM 185, BSCM 195, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data.

With attention invited again to FIG. 1, vehicle 100 also may include VCS 205 to be the SYNC onboard vehicle computing system manufactured by the Ford Motor Company (See, for example, U.S. Pat. No. 9,080,668). Vehicle 100 also may include a powertrain control unit/module (PCU/PCM) 215 coupled to VSC 200 or another controller, and coupled to CAN 210 and engine 115, M/G 120, and TC 155 to control each powertrain component. A transmission control unit (TCU) 220 is also coupled to VSC 200 and other controllers via CAN 210, and is coupled to transmission 160 and also optionally to TC 155, to enable operational control. An engine control module (ECM) or unit (ECU) or energy management system (EMS) 225 may also be included to be in communication with CAN 210, and is coupled to engine 115 and VSC 200 in cooperation with PCU 215 and TCU 220 and other controllers.

In this arrangement, VSC 200 and VCS 205 cooperatively manage and control the vehicle components and other controllers, sensors, and actuators. For example, the controllers may communicate control commands, logic, and instructions and code, data, information, and signals to and/or from engine 115, disconnect clutch 125, M/G 120, TC 155, transmission 160, batteries 175, 180, and MCM 185, brakes 190, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers.

For example, vehicle 100 may include an accelerator pedal having a position and motion sensor (APP) 230. A brake pedal position and motion sensor (BPP) 235 is also incorporated about a conventional foot-actuated brake pedal. The foot-actuated brake pedal incorporates a nominal brake-pedal full-range of motion, which is used to decelerate and stop HEV 100 and to actuate rear brake lights, as may be known to those working in the field of technology. In addition, the brake pedal and BPP 235 of the disclosure also includes a smaller, actuation range of motion 240 (FIG. 1), which may be configured to actuate additional capabilities of HEV 100, such as regenerative braking, during a sequence of operation that includes a tip-in and tip-out sequence. The smaller, actuation range of motion 240 of BPP 235 is configured to generate a brake pedal signal (BPS) 245 that includes and/or indicates a brake pedal tip-in, and tip-out or lift (hereafter referred to as "tip-lift") time. BPS 245 also includes a tip-in extent or tip-lift position within the smaller, actuation range of motion 240.

The tip-lift time is the time during which brake pedal 235 is tipped-in and then released or lifted or tipped back out again, which occurs during a one-touch or a single, continuous tip-lift cycle of the actuation range of motion 240. The tip-in or lift or tip-lift position is the maximum extent or maximum distance of travel of the brake pedal within the smaller, actuation range of motion 240, and which occurs during the one-touch or the single, continuous tip-lift timespan.

BPS 245 may embed the one touch, tip-lift time and position, for one or more such one touch cycles having a predetermined time-span limit, and also having a predetermined tip-lift position limit during this predetermined time-span limit. Brake pedal actuation cycles that fall outside such predetermined one-touch cycle time/position limits, wherein either the tip-lift time or position exceed the predetermined time-span and position limits and/or which extend beyond the smaller, actuation range of motion 240, are not embedded in BPS 245. Tip-lift times and positions that exceed the limits are instead treated as nominal driver actuations of brake pedal 235 that enable conventional slowing and stopping of HEV 100. In these arrangements, such predetermined one-touch cycles enable brake pedal 235 to actuate additional capabilities of HEV 100, in addition to enabling routine, conventional braking capabilities.

For example, a driver may actuate brake pedal 235 with the one-touch cycle mode to actuate regenerative braking, as an example of one such additional capability. In this example, brake pedal 235 may be briefly depressed within the smaller, actuation range of motion 240. This partial, smaller, actuation range of motion 240 may be predetermined to not exceed some preferred, adjustable, or predetermined actuation time limit and range of motion limit, for purposes of illustration but not limitation. More specifically, for further example, brake pedal 235 may be depressed or tapped quickly during such a one-touch cycle for a predetermined time span or limit not exceeding the range of approximately between about 500 and about 1,500 milliseconds or more or less.

Concurrently during this one-touch cycle, brake pedal 235 may be depressed within the smaller, actuation range of motion 240, to a predetermined extent or distance or position limit of about 5 to 10 degrees of arc or about 10 to 35 millimeters in limited forward motion, or more or less. In this example, the controllers and BPS 245 detect that the one touch actuation of brake pedal 235 was cycled within the actuation range of motion 240 for a time span that is preferably long enough to avoid unwanted noise from inadvertent taps or unintentional touches or vibrations of the brake pedal 235, but within the predetermined one-touch cycle time span of about 500 to about 1,500 milliseconds. BPS 245 and the enabling controllers also detect that the movement of brake pedal 235 was positioned to an extent within the predetermined position between about 5 to 10 degrees or about 10 to 35 millimeters. Upon detecting this one-touch cycle attempt to actuate the additional capabilities, one of the controllers and BPP 235 generate BPS 245 to include and/or embed the tip-lift time and position, which signal 245 and embedded data is used to initiate the possibly preferred additional capability, such as regenerative braking, for example.

Such one-touch cycle parameters that may include the defined smaller, actuation range of motion 240, the predetermined time spans, and the predetermined positions, may be selectable, adjustable, and/or predefined and constant, and may be stored with other parameters and information, and may be stored in BPS 245, other controllers, storage devices, and may be part of other driver controls and vehicle profile and performance parameters (VPP) 250.

Such VPPs 250 may also include, for purposes of example without limitation, steering wheel position and motion sensors, driver turn signal position sensors, driver selectable vehicle performance preference profiles and parameters, and vehicle operational mode sensors and related parameters and settings. Such parameters, and settings may include profile parameters, which may be driver selectable through a vehicle user interface (not shown, but available with the Ford SYNC system) and which may establish various preferred and/or predetermined vehicle performance characteristics and driver profile preferences, including the tip-lift time and position information, and other information as described elsewhere herein.

Further, vehicle 100 may have VCS 205 configured with one or more communications, navigation, GPS—global positioning system vehicle position sensors and controllers, and other sensors, as described elsewhere herein with respect to the Ford Motor Company SYNC system, and other similar systems. VCS 205 can cooperate with VSC 200 and other controllers to manage and control vehicle 100 in response to sensor and communication signals identified, established by, and received from these vehicle systems and components, which signals may include other signals (OS) 255. For example, proximity sensors may be included to enable VSC 200, VCS 205, and other controllers to detect nearby roadway obstacles such as nearby vehicles. One or more, or at least one rear and one front proximity sensor(s) (PS Rear) 260, (PS Front) 265 (FIG. 1) may detect distances to vehicles behind and in front of HEV 100. PS rear and front proximity sensors 260, 265 may detect a distance to such nearby vehicles and generate proximate vehicle signals (PVS) 270 that include and/or identify the nearby-vehicle distance. If there are not any nearby vehicles ahead or behind HEV 100, PVSs 270 may indicate nearby vehicles are not detected or are undetected.

For further example, various other vehicle functions, actuators, and components may be controlled by the controllers within the vehicle systems and components, and may receive signals from other controllers, sensors, and actuators, which may include, for purposes of illustration but not limitation, front-end accessory drive (FEAD) components such as an air conditioning compressor, a transmission oil pump, an alternator or generator, another M/G 120, high and low voltage batteries 175, 180, and various sensors and components for regenerative and friction braking, battery charging or discharging (including sensors for determining the maximum or optimal battery charge, state of charge or charge state (SOC), and battery discharge power limits, temperature, voltage, and battery current, and pressures for disconnect clutch 125, bypass/launch clutch 157, TC 155, transmission 160, and other components.

Figure 2:
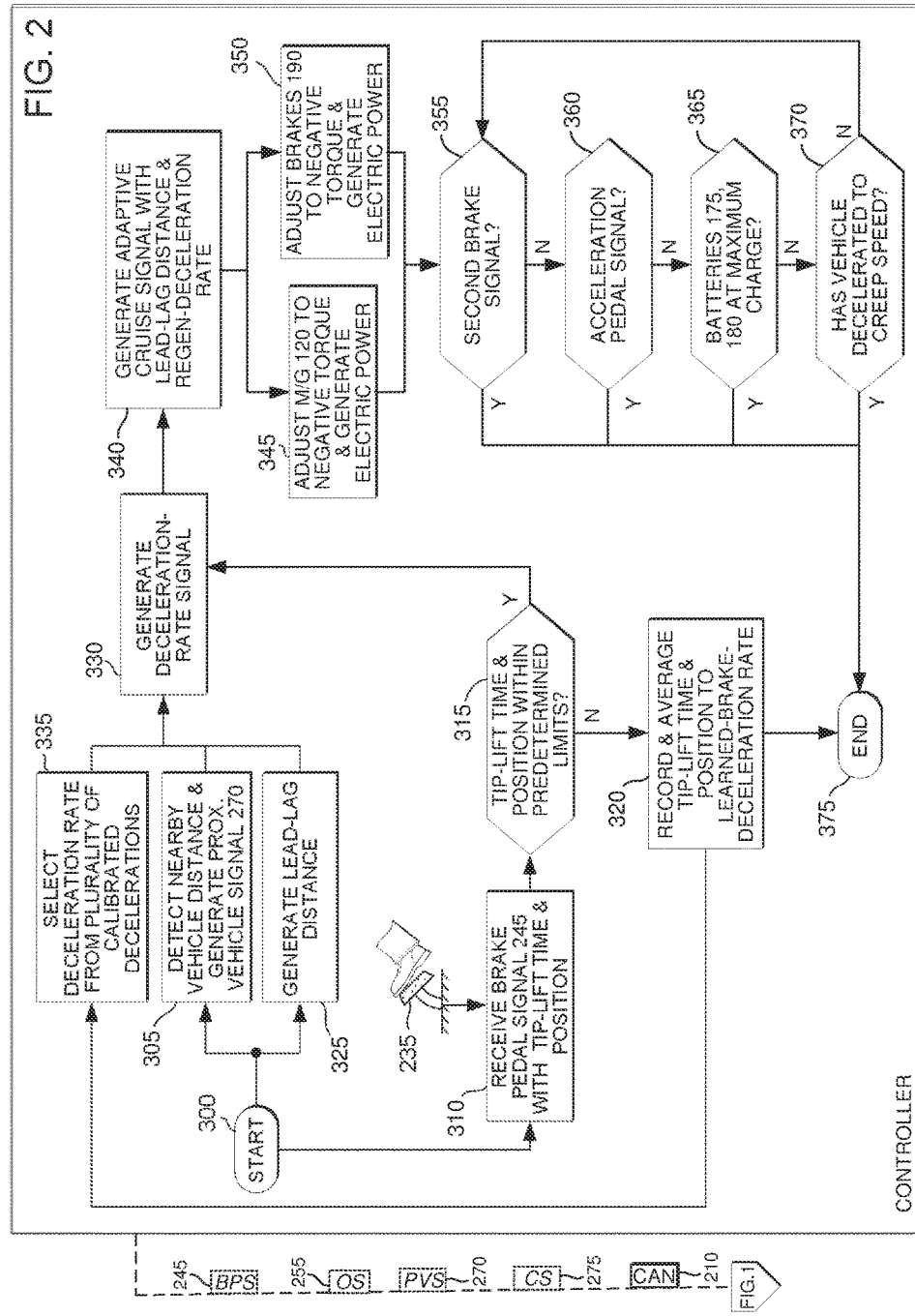
FIG. 2 illustrates additional aspects and capabilities of the vehicle and systems and methods of FIG. 1, with certain components and features added, removed, modified, and rearranged.

As depicted in the various figures, including FIGS. 1 and 2, and others, control logic and executable instructions and signals, and data can also include control or command signals (CS) 275 received from and sent to vehicle controllers, components, and systems. Such signals and commands may be from any of the vehicle controllers, sensors, actuators, components, and systems signals. Any or all of these signals can be raw analog or digital signals or preconditioned, preprocessed, combination, and/or derivative signals generated in response to other signals, and embedding analog and digital information therein. BPS 245, OS 255, PVS 270, CS 275, and other signals and commands, may include a variety of specific signals, commands, predetermined parameters, and/or data, including for purposes of illustration without limitation, battery charge state, optimal or maximum battery charge state, vehicle speed, BPP 235 actuation range of motion 240, brake pedal tip-lift time and position, a preferred minimum or adjusted lead-lag distance between HEV 100 and nearby vehicles, and various limit signals, as well as digital data and information embedded in such signals, and as described in more detail elsewhere herein.

Figure 3:
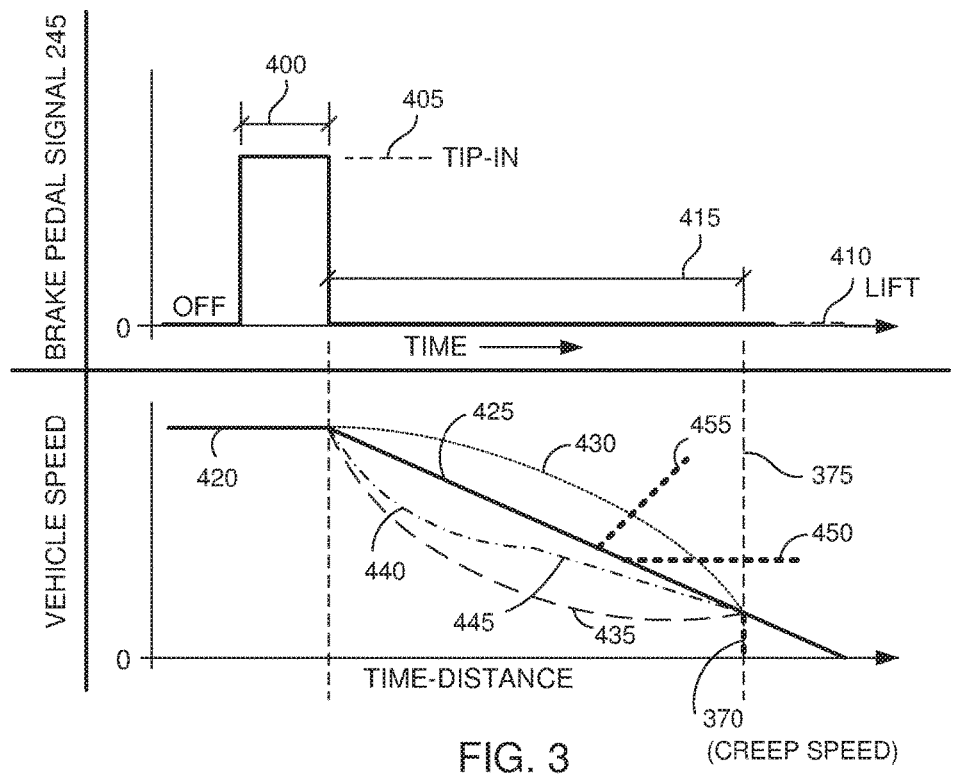
FIG. 3 depicts various brake pedal times, positions, and signals, vehicle speeds, and decelerations for aspects of the vehicle systems and methods of FIGS. 1 and 2.
Figure 4:
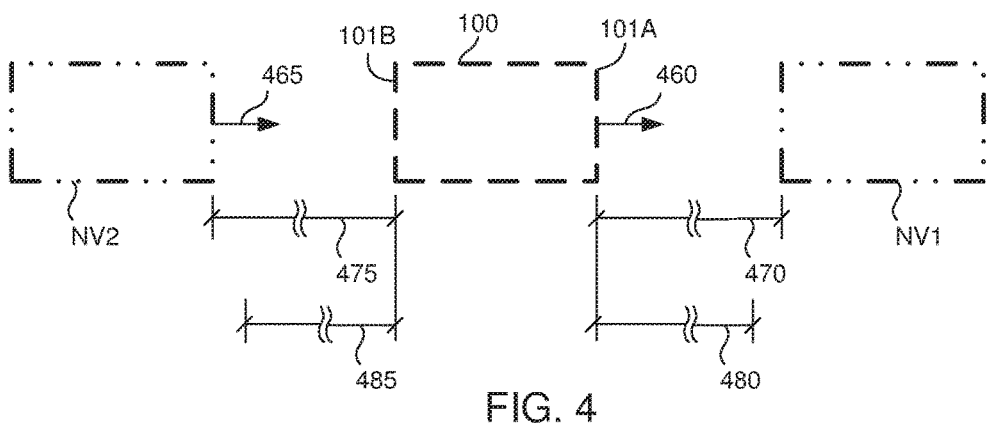
FIG. 4 depicts a schematic of various positions of the vehicle of FIGS. 1, 2, and 3, and relative positions and distances of nearby obstacles, such as nearby vehicles.

The communication and operation of the described signals, control instructions and logic, and data and information by the various contemplated controllers, sensors, actuators, and other vehicle components, may be represented schematically as shown in FIG. 1, and by flow charts or similar diagrams as exemplified in FIGS. 2, 3, and 4, and elsewhere herein. Such flow charts and diagrams illustrate exemplary commands and control processes, control logic and instructions, and operation strategies, which may be implemented using one or more computing, communication, and processing techniques that can include real-time, event-driven, interrupt-driven, parallel processing, multi-tasking, multi-threading, and combinations thereof. The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers and may be embodied as primarily hardware, software, virtualized hardware, firmware, virtualized firmware, and combinations thereof.

During operation of vehicle 100, and with continued reference to FIG. 1 and now also to FIG. 2, vehicle 100 incorporates one or more controllers, such as one or more of BSCM 195, VSC 200, VCS 205, a restraint system control module (RCM) 280 that may include various accelerometers, and other controllers. Such controller(s) is/are configured to initiate various signals, control logic, CS 275, and instructions 300 (FIG. 2). The controllers may initiate regenerative braking at step 300, upon detecting or receiving brake pedal signal or BPS 245 indicating and/or having the tip-lift time and position 310, and proximate vehicle signal or PVS 270 having and/or indicating the nearby-vehicle distance 305.

If the tip-list time and position 310 are not within the predetermined time span and position limits 315, then BPS 245 is deemed a nominal actuation of brake pedal 235. In this case, the tip-lift time and position 310 are recorded and averaged to a learned-brake-deceleration rate 320 for use in generating a preferred driver deceleration "feel" for prospective braking events. Learned-brake-deceleration rate 320 may be selected as a deceleration rate for such prospective braking events. Additionally, the learned-brake-deceleration rate 320 may also incorporate data from accelerometers than can further improve recordation of the vehicle performance feel. Such accelerometers may include such sensors incorporated about HEV 100 in any number of systems, including for further example, the accelerometers of RCM 280.

When the tip-lift time and position 310 meet the predetermined limits 315, the controllers also then generate, adjust, and/or communicate a predetermined or adjusted lead-lag distance 325. Lead-lag distance 325 establishes a preferred minimum distance to be maintained between HEV 100 and nearby vehicles. Lead-lag distance 325 may be a predetermined constant distance and/or may be adjusted and established, for example, using HEV 100 speed, mass, acceleration and deceleration, road conditions, temperature, precipitation, and other variables. A relative speed between HEV 100 and a speed of the nearby vehicles may also be used, which is ascertained utilizing a rate of change of the nearby-vehicle distance 305. The controllers then establish and generate a deceleration-rate signal 330 that indicates and/or corresponds to the nearby-vehicle distance 305. An adaptive cruise signal 340 is also generated by the controllers and includes and/or indicates the lead-lag distance 325, among other parameters and information. The deceleration-rate signal 330 may include, indicate, and/or be adjusted by a deceleration rate selected from a plurality of calibrated-deceleration rates 335, which may include the learned-brake-deceleration rate 320, as may be understood with continuing reference to FIG. 2.

The deceleration-rate signal 330 is then communicated by the controller(s) to cause at step 345 the electric machine or M/G 120 to generate electric power with negative torque, and to decelerate the transmission 160 and wheels 154 at a rate adjusted and/or according to by deceleration-rate signal 330. The controllers enable the battery(ies) 175, 180 to capture the regenerated electrical energy while they have a charge state below a maximum or optimal charge state. Once fully charged, the regenerated electrical energy is be shunted to ground or otherwise used elsewhere in HEV 100, since the battery(ies) 175, 180 do not need the extra power. While regenerative braking 300 may continue, the charge state of battery(ies) 175, 180 does not exceed the maximum or optimal charge state.

As previously described, brakes 190 may be friction brakes, regenerative brakes, and combination regenerative-friction brakes 190. As a further example of HEV 100 utilizing regenerative-friction brakes 190, the controllers may be further configured to also to cause at steps 345 and 350, one or more of electric machine or M/G 120 and brakes 190 to generate the electric power with the negative torque and to decelerate the transmission 160 and wheels 154 at a rate adjusted and/or indicated by deceleration-rate signal 330. In other variations, the controller(s) are further configured to adjust the deceleration-rate signal 330 and cause the electric machine 120 to increase the negative torque 345 to a magnitude that causes HEV 100 to decelerate so that the nearby-vehicle distance is approximately equal to or exceeds the predetermined lead-lag distance 325.

In still other arrangements, the controller(s) are further configured to cause electric machine or M/G 120 and brakes 190 to cooperatively decelerate wheels 154 and transmission 160 at the selected rate 335 to decrease brake torque 350 as the electric machine 120 negative torque 345 is increased, to increase the charge state of the batteries 175, 180 not to exceed the maximum. Similarly, the controller(s) may respond to the nearby-vehicle distance 305 being undetected, that is there are no nearby vehicles detected, and cooperatively to cause the electric machine 120 to decelerate the wheels 154 and transmission 160 at the selected rate 335 by decreasing brake torque 350 by an amount of the increased electric machine negative torque 345. In a different variation, the controller(s) adjust the selected rate 335 to cause the electric machine 120 to decelerate the wheels 154 and transmission 160 with brake torque 350 being decreased by increased by an amount of electric machine negative torque 345, adjusted to again increase the charge state of the battery(ies) 175, 180 to not exceed the maximum.

The HEV 100 of the disclosure contemplates variations that may be incorporated with any of the other arrangements disclosed herein, and to have the deceleration-rate signal 330 including and/or indicating a selected one of the plurality of the calibrated, constant, adjustable, deceleration rates 335, which include the learned-brake-deceleration-rate 320. In added examples, the learned-brake-deceleration rate 320 may average a plurality of prior braking signals 245, which are recorded during prior braking events, and averaged to establish a preferred driver braking profile or "feel" during such braking events. Another arrangement includes one or more of the deceleration-rate signals 330 indicating and/or including a rate selected from one of the plurality of calibrated-deceleration rates 335 that are predetermined and calibrated for a range of various HEV 100 performance and component capabilities.

The controller(s) can use the selected deceleration rate 335 to adjust and cause electric machine or M/G 120 to decelerate transmission 160, as well as drive shafts 140, 150, and wheels 154, thus slowing HEV 100 while regenerating decelerating kinetic energy into electric power. Such other calibrated-deceleration rates 335 of the plurality may further include adjustable rates calibrated for environmental and roadway conditions, and vehicle mass and performance with various engine 115 and M/G 120 components and configurations, and for decelerations at various speeds and over a range of lead-lag distances 325. In additional modifications to the embodiments of the disclosure, the plurality of calibrated decelerations 335 may further include decelerations 330, 335 being calibrated to capture a predetermined and/or predicted maximum and most efficient regenerative braking energy, as electrical power for a range of HEV 100 configurations and operating conditions, lead-lag distances 325, battery charge states, and nearby-vehicle distances 305.

Similarly, another calibrated deceleration of the plurality 335 may include a maximum or aggressive deceleration 335 that is also calibrated to decelerate HEV 100 as quickly as possible. Also possible and contemplated are a gradual deceleration and the previously described learned-brake-deceleration rate 320. Yet further selectable deceleration rates of the plurality 335 may include an adaptive cruise deceleration that may be, for example, included with the adaptive cruise signal 340, and which adjusts the deceleration-rate signal 330 to enable HEV 100 to decelerate while following a decelerating nearby-vehicle, at or exceeding the lead-lag distance, while both HEV 100 and the nearby, leading vehicle continue to decelerate.

Other modifications of HEV 100 include the learned-brake-deceleration-rate being utilized by the controller(s) to cause M/G 120 to increase negative torque 345 to decelerate transmission 160 and wheels 154 at learned-brake-deceleration-rate 320, which rate can also be further adjusted to approximately maintain the nearby-vehicle distance 305. Each of such calibrated decelerations of the plurality 330 may be selected, and may be predetermined, predicted, and/or adjusted in some applications by a driver through a user interface (not shown) in HEV 100, which interface may be the Ford SYNC system noted previously.

In other modifications, the proximity sensor(s) may generate the nearby-vehicle distance 305 to be a follow-distance or lag-behind-distance between a front end of HEV 100 to the nearby vehicle. The nearby-vehicle distance 305 may also be a lead-distance between a rear end of HEV 100 to the nearby vehicle. The nearby-vehicle distance 305 also contemplates a combination when there are multiple nearby vehicles in front of and behind HEV 100. In the combination variation, the longer of the lead or lag distances may be used as the nearby-vehicle distance 305. Described differently, both distances may employed concurrently by the controllers to enable HEV 100 to simultaneously maintain multiple nearby-vehicle distances 305 using both the lead and lag distances. In other configurations, the controller(s) are further configured to cause M/G 120 to decelerate wheels 154 and transmission 160 at the selected rate 335 or another rate 330 when the nearby-vehicle distance is undetected, which may occur when there are not any other obstacles or vehicles near enough to be detected by the proximity sensor(s) 260, 265.

In each and all of these configurations of the disclosure, the controllers continue to decelerate the wheels 154, the transmission 160 with the M/G 120, and/or the brakes 190 generating negative torque and regenerating electrical power to charge the batteries 175, 180, while slowing HEV 100. The deceleration continues until another event occurs, such as (a) a new, second brake signal 355 is generated, (b) a new nearby vehicle appears, (c) an acceleration pedal signal is detected 360, the battery(ies) 175, 180 have reached a maximum charge state 365, and/or (d) until HEV 100 reaches a slower speed 370 just above a stopping point, which may be referred to as a creep speed 370. An accelerator pedal signal 360 will terminate regenerative braking and deceleration 375. If the battery(ies) 175, 180 have reached a maximum charge state, they can no longer store energy, and regenerative braking 300 may be configured to be discontinued 375, unless the generated electrical power 345, 350 used elsewhere or can be shunted to a ground so that M/G 120, brake 190 negative torque braking may continue.

At the creep speed 370, HEV is likely moving too slow to enable regenerative braking 300, which is consequently terminated 375. It may be optionally preferred to alert a driver of termination. The second brake signal 355 may include tip-lift time and position 310 again within the predetermined limits 315, and control instructions 300 may be configured to then discontinue deceleration 375 and disengage regenerative braking. Alternatively, the second brake signal 355 may not include tip-lift time and position 310, if such were outside of or exceeded the predetermined limits 315. In this latter circumstance, regenerative braking and deceleration are also discontinued 375, or in an alternative, regenerative braking may continue in adaptive cruise mode as HEV 100 is decelerated at a rate to enables following a lead nearby vehicle while maintaining the lead-lag distance.

With continued reference to the preceding figures, and now also with reference to FIGS. 3 and 4, various implementations of the disclosure illustrate further examples of performance of HEV 100 and its controllers, systems, and components, and related methods of operation. In FIG. 3, those knowledgeable in the technology of the disclosure may further comprehend relationships between brake pedal signal 245 and tip-lift time and position 310, and the deceleration-rate signal 330, and respective sequences of operation, among other features. The tip-lift time span 400 shown in an upper portion of FIG. 3 is reflected against a time scale, and the tip-lift "tip-in" extent or position 405 is depicted schematically in a sequence against the vertical scale. Upon release or "tip-out" or "lift" 410, the sequence continues and brake pedal 235 returns to an "OFF" or rest or lift positon 410. Regenerative braking 300 continues thereafter over the period of time denoted 415, during which deceleration-rate signal 330 persists.

The speed of HEV 100 is depicted schematically about a lower portion of FIG. 3, and reflects a starting or initial speed 420 before brake pedal signal 245 is generated, and regenerative braking 300 begins. Once the one-touch cycle, tip-lift time and position 310 are determined to meet the limits 315, deceleration-rate signal 330 is generated and deceleration of HEV 100 wheels 154 and transmission 160 begins at the selected deceleration rate 425. The selected deceleration rate 425 may be modified as described elsewhere herein to be any of the selected calibrated-deceleration rates of the plurality 335, and may have gradually changing slopes such that HEV 100 decelerates at rates 430 or 435, for example. Hybrid or complex deceleration rate 330 may be selected from plurality 335 to have both gradually changing deceleration rates 440 combined with constant deceleration rates 445. The deceleration rates 425, 430, 435, and 440-445, are discontinued 375 once creep speed 370 is reached, or upon another event as already described, upon which regenerative braking and deceleration stops 375 and vehicle speed may become constant 450, or may accelerate 455 in response to accelerator pedal signal 360.

With continuing reference to the preceding figures and now also specifically to FIG. 4, a schematic of HEV 100 during operation is illustrated, for purposes of added example, but not limitation, and includes nearby vehicles NV1 and NV2. As also described in more detail previously, HEV 100 includes the front end 101A and the rear end 101B. The HEV 100 has an initial speed in direction 460, and NV2 has a speed in direction 465. Front proximity sensor(s) 265 detect NV1 to have nearby-vehicle distance 305 of distance 470, and rear proximity sensor(s) 260 detect NV2 to have a nearby-vehicle distance 305 of distance 475. With these illustrations, the skilled technologist may further understand that the lead-lag distances 325 may include multiple such lead-lag distances 480 and 485, which are utilized to adjust the deceleration rate signals 330 and the calibrated decelerations 335. The decelerations 330, 335 further adjust negative torques 345 and 350 to regenerate power to charge batteries 175, 180 during braking, and to adjust the nearby-vehicle distances 470, 475 to approximately equal or exceed the minimum preferred lead-lag distances 480, 485 (also 325 in earlier descriptions).

The descriptions herein refer to systems, methods, components, elements, nodes, or features being in "communication" and or "coupled" together. As used herein, unless expressly stated otherwise, use of these terms and words are intended and must be understood to mean that one system/method/sensor/actuator/component/element/module/feature is directly or indirectly coupled, joined to, and/or communicates with another, either electronically, mechanically, or both and in some similar way that enables cooperative operation and exchange and interchange of data and information.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings must not be construed to limit the description to a given example, or to an exemplary item commercially available in the market as of a specific date and time period.

Instead, these descriptions are intended to be understood to include conventional, traditional, normal, or standard technologies that may be available now and at any time in the future in some improved and modified form according to the innovations described in this disclosure. Similarly, a group of words described and joined with the conjunction "and" or the disjunctive "or" must be understood only as exemplary and representative but not exclusive groups, and not as requiring that only or each and every one of those described items must be or must not be present in the contemplated group. Rather, use of such conjunctives and disjunctives must be understood to mean "and/or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular, the plural is also intended and contemplated to be within the scope of such a description unless limitation to the singular is explicitly stated as a requirement. The presence or absence of broadening words and phrases such as "one or more," "at least," "but not limited to" or other like phrases in some instances are intended to be interpreted to contemplate broader meanings, but must not be understood to mean that narrower meanings are implied, intended, or required While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a controller in communication with an electric machine coupled to a transmission; and
   the controller configured, responsive to a proximate vehicle signal indicating a nearby-vehicle distance, and a brake pedal signal, to cause the electric machine to generate negative torque to decelerate the transmission such that the nearby-vehicle distance equals or exceeds a target lead-lag distance.

2. The vehicle according to claim 1, further comprising:
   the controller further configured to cause the electric machine to generate negative torque to decelerate the transmission at a learned-brake-deceleration-rate that is based on averages of a plurality of prior brake signals.

3. The vehicle according to claim 1, further comprising:
   at least one proximity sensor configured to generate the proximate vehicle signal.

4. The vehicle according to claim 1, further comprising:
   at least one proximity sensor coupled to the controller and configured to detect distance to a nearby vehicle and to generate the proximate vehicle signal; and
   the controller further configured, in response to the nearby-vehicle distance being undetected, to cause the electric machine to decelerate the transmission at a selected rate.

5. The vehicle according to claim 1, further comprising:
the controller configured, in response to an acceleration pedal signal or a second brake pedal signal, to discontinue deceleration.

6. A method for controlling a vehicle, comprising:
commanding by a controller, responsive to a proximate vehicle signal indicating a nearby-vehicle distance, and a brake pedal signal indicating a tip-lift time and position, an electric machine to generate electric power and negative torque to increase a battery charge state and to decelerate a transmission according to a deceleration-rate signal adjusted to increase the nearby-vehicle distance to a lead-lag distance.

7. The method for controlling the vehicle according to claim 6, further comprising:
providing the transmission further coupled to a drive shaft and wheels having brakes,
an adaptive cruise signal indicating the lead-lag distance, and
at least one proximity sensor coupled to the controller and configured to detect distance to a nearby vehicle and to generate the nearby-vehicle distance;
a brake pedal tip-in/tip-out sequence generates the brake pedal signal to indicate the tip-lift time and position; and
adjusting by the controller the deceleration-rate signal to cause the electric machine to increase the negative torque of one or more of the electric machine and brakes to a magnitude that causes the nearby-vehicle distance to approximately equal or exceed the lead-lag distance.

* * * * *